US010520339B2

(12) United States Patent
Lou et al.

(10) Patent No.: US 10,520,339 B2
(45) Date of Patent: Dec. 31, 2019

(54) TWO-DIMENSIONAL THREE-DEGREE-OF-FREEDOM MICRO-MOTION PLATFORM STRUCTURE FOR HIGH-PRECISION POSITIONING AND MEASUREMENT

(71) Applicants: NANJING UNIV. OF AERONAUTICS AND ASTRONAUTICS, Jiangsu (CN); MIRACLE AUTOMATION ENGINEERING CORP. LTD., Jiangsu (CN)

(72) Inventors: Peihuang Lou, Jiangsu (CN); Dahong Guo, Jiangsu (CN); Xiaoming Qian, Jiangsu (CN); Jiong Zhang, Jiangsu (CN)

(73) Assignees: NANJING UNIV. OF AERONAUTICS AND ASTRONAUTICS, Jiangsu (CN); MIRACLE AUTOMATION ENGINEERING CORP. LTD., Jiangsu (CN)

( * ) Notice: Subject to any disclaimer, the term of this patent is extended or adjusted under 35 U.S.C. 154(b) by 0 days.

(21) Appl. No.: 16/461,699

(22) PCT Filed: Dec. 13, 2017

(86) PCT No.: PCT/CN2017/115822
§ 371 (c)(1),
(2) Date: May 16, 2019

(87) PCT Pub. No.: WO2019/052044
PCT Pub. Date: Mar. 21, 2019

(65) Prior Publication Data
US 2019/0353507 A1  Nov. 21, 2019

(30) Foreign Application Priority Data

Sep. 13, 2017  (CN) .......................... 2017 1 0821868

(51) Int. Cl.
*G01D 11/30* (2006.01)
*B23Q 1/34* (2006.01)
(Continued)

(52) U.S. Cl.
CPC ............... *G01D 11/30* (2013.01); *B23Q 1/34* (2013.01); *G01Q 10/04* (2013.01); *G02B 21/26* (2013.01)

(58) Field of Classification Search
CPC .......... B23Q 1/34; G02B 21/26; G01Q 10/04
See application file for complete search history.

(56) References Cited

U.S. PATENT DOCUMENTS 4,615,591 A * 10/1986 Smith ...................... G12B 1/00
248/576
4,667,415 A * 5/1987 Barsky ..................... B23Q 1/36
269/73
(Continued)

FOREIGN PATENT DOCUMENTS

CN          1601171 A        3/2005
CN        101738855 A        6/2010
(Continued)

*Primary Examiner* — David A Rogers
(74) *Attorney, Agent, or Firm* — Muncy, Geissler, Olds & Lowe, P.C.

(57) ABSTRACT

A two-dimensional three-degree-of-freedom micro-motion platform structure for high-precision positioning and measurement. Two series flexible hinges are connected in parallel to form a moving pair. One end of the moving pair is fixed, and driving force is applied to the other end. The driving force is amplified by means of a lever to drive the moving pair to translate and rotate. The moving pair drives a first flexible hinge of a platform to rotate, thereby driving (Continued)

the platform to produce corresponding displacement. Four identical moving pairs and four identical first flexible hinges respectively constitute four branch hinges which are different in arrangement; two branch hinges opposite to the platform are in central symmetry and constitute one group, and the four branch hinges are divided into two groups in total. The piezoelectric driving mode can be adopted, and thus the linear displacement in the x-axis direction, the linear displacement in the y-axis direction and the angular displacement in the direction around the z-axis are generated for optical precision positioning and measurement.

5 Claims, 1 Drawing Sheet

(51) Int. Cl.
  *G02B 21/26* (2006.01)
  *G01Q 10/04* (2010.01)

(56) References Cited

U.S. PATENT DOCUMENTS

| | | | | |
|---|---|---|---|---|
| 4,691,586 A * | 9/1987 | van Leijenhorst | ....... | B23Q 1/36 248/251 |
| 4,805,543 A * | 2/1989 | Schwab | ................ | B23Q 1/36 108/20 |
| 5,051,594 A * | 9/1991 | Tsuda | ................ | G01B 7/003 250/440.11 |
| 5,083,757 A * | 1/1992 | Barsky | ................ | B23Q 1/36 267/181 |
| 5,281,884 A * | 1/1994 | Basavanhally | ........ | H02N 2/028 310/328 |
| 5,297,130 A * | 3/1994 | Tagawa | ................ | G01Q 10/04 369/126 |
| 6,346,710 B1 * | 2/2002 | Ue | ................ | G12B 5/00 250/311 |
| 6,467,761 B1 * | 10/2002 | Amatucci | ................ | B23Q 1/34 248/419 |
| 6,484,602 B1 * | 11/2002 | Dagalakis | ................ | B23Q 1/34 74/490.01 |
| 6,806,991 B1 * | 10/2004 | Sarkar | ................ | G02B 26/0841 359/290 |
| 7,024,925 B2 * | 4/2006 | Gweon | ................ | B23Q 1/34 248/419 |
| 7,093,827 B2 * | 8/2006 | Culpepper | ................ | F16C 11/12 267/160 |
| 7,107,693 B2 * | 9/2006 | Nesch | ................ | F16C 11/12 248/424 |
| 7,240,434 B2 * | 7/2007 | Lee | ................ | H02N 2/0095 269/903 |
| 7,308,747 B2 * | 12/2007 | Smith | ................ | B81C 99/002 248/593 |
| 7,348,571 B2 * | 3/2008 | Ue | ................ | G01Q 10/02 250/442.11 |
| 7,348,709 B2 * | 3/2008 | Xu | ................ | H02N 2/043 310/328 |
| 7,409,118 B2 * | 8/2008 | Said | ................ | G02B 6/3508 385/12 |
| 8,310,128 B2 * | 11/2012 | Ferreira | ................ | H02N 1/008 310/309 |
| 8,390,233 B2 * | 3/2013 | Shilpiekandula | ...... | B82Y 10/00 318/135 |
| 8,495,761 B2 * | 7/2013 | Shibuya | ................ | B82Y 35/00 250/440.11 |
| 9,069,109 B2 * | 6/2015 | Hwang | ................ | G02B 7/005 |
| 9,370,865 B1 * | 6/2016 | Vangal-Ramamurthy | ................ | B23P 19/102 |
| 10,239,167 B2 * | 3/2019 | Yang | ................ | B23Q 1/62 |
| 2002/0020069 A1 * | 2/2002 | Bottinelli | ................ | B23Q 1/34 33/1 M |
| 2003/0051331 A1 * | 3/2003 | Amatucci | ................ | B23Q 1/34 29/466 |
| 2004/0163450 A1 * | 8/2004 | Gweon | ................ | B23Q 1/34 73/105 |
| 2007/0114441 A1 * | 5/2007 | Ue | ................ | B82Y 35/00 250/440.11 |
| 2011/0321203 A1 | 12/2011 | Shibuya et al. | | |
| 2012/0279344 A1 * | 11/2012 | Hwang | ................ | G02B 7/005 74/490.08 |
| 2013/0212749 A1 * | 8/2013 | Watanabe | ................ | G01Q 10/04 850/4 |
| 2017/0001275 A1 * | 1/2017 | Yang | ................ | B23Q 1/62 |

FOREIGN PATENT DOCUMENTS

| | | |
|---|---|---|
| CN | 103225728 A | 7/2013 |
| CN | 104595642 A | 5/2015 |
| CN | 205943470 U | 2/2017 |
| KR | 10-2011-0087418 A | 8/2011 |
| WO | WO-2006050560 A1 * | 5/2006 ................ B25J 7/00 |

\* cited by examiner

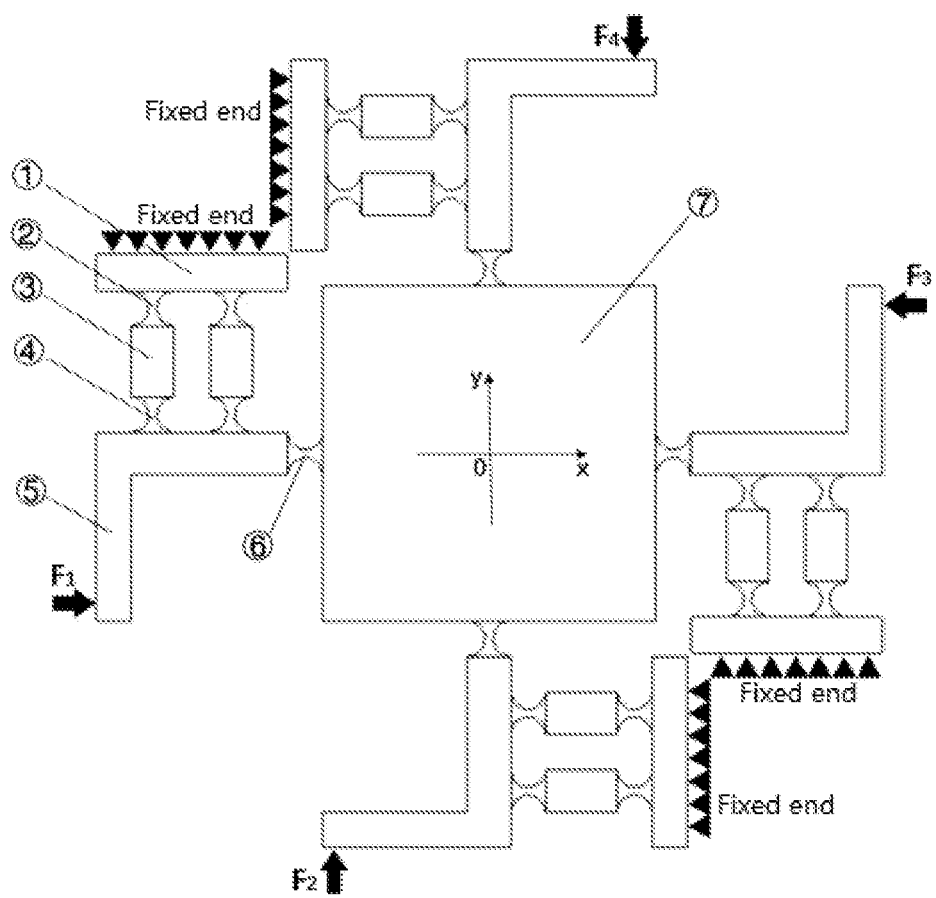

TWO-DIMENSIONAL THREE-DEGREE-OF-FREEDOM MICRO-MOTION PLATFORM STRUCTURE FOR HIGH-PRECISION POSITIONING AND MEASUREMENT

BACKGROUND OF THE INVENTION

Field of the Invention

The present invention relates to a two-dimensional three-degree-of-freedom micro-motion platform structure for high-precision positioning and measurement, and belongs to the field of micro/nano electro-mechanical systems.

Description of Related Art

At present, a micro-motion platform is widely used in precise positioning and measuring instruments, and has high precision, and a principle is a technology that generates displacement based on elastic deformation of a compliant mechanism. Flexibility of a series branch hinge of a series micro displacement platform is better than that of a parallel branch hinge (Shan Mingcai, Wang Weiming, Ma Shuyuan, Liu Shuang, Xie Hu. Analysis and Design of Large Stroke Series Flexure Mechanism. Nanotechnology and Precision Engineering, 2012(5): 268-272), but rigidity of the series branch hinge is poorer than that of the parallel branch hinge. When the series branch hinge generates elastic deformation that can be used, due to the limited precision of the flexible hinge, the center of rotation drifts [Chen Guimin, Han Qi, et al. Deep-notch Elliptical Flexure Hinges. Optics and Precision Engineering, 2009(3): 570-575] [Chen Guimin, Jia Jianyuan, Liu Xiaoyuan, Gou Yanjie, et al. Study on the Accuracy of Flexible Hinges. Chinese Journal of Scientific Instrument, 2004(8): 107-109]. Consequently, the load-displacement linearity of the compliant mechanism is relatively poor, resulting in generating relatively large parasitic elastic deformation, affecting the positioning and measurement results. In terms of the accuracy of generalized displacement, when beneficial generalized displacement is satisfied, the overall rigidity of a branch hinge should be improved to the greatest extent, to resist parasitic elastic deformation and improve the accuracy of the generalized displacement, thereby improving the positioning and measurement results. In this case, it is necessary to invent a micro-motion platform that not only can generate beneficial generalized displacement but also can effectively resist parasitic elastic deformation.

SUMMARY OF THE INVENTION

Technical Problem

With respect to the disadvantages of a series micro displacement platform, in a two-dimensional three-degree-of-freedom micro-motion platform structure for high-precision positioning and measurement of the present invention, translation movement of a branch hinge is performed by a parallel moving mechanism, and the overall rigidity thereof is greater than that of a common series branch hinge, so that parasitic elastic deformation can be effectively resisted, and load-displacement linearity is relatively good. To reduce the effect of resistance of rigidity against the driving force, direct force is not input into an input end; instead, a leverage equivalent torque is input, to amplify input displacement, thereby making a branch hinge moving range larger.

Technical Solution

The present invention adopts the following technical solution: a two-dimensional three-degree-of-freedom micro-motion platform structure for high-precision positioning and measurement, including: a platform, a first flexible hinge, and a moving pair that is fastened on the platform through the first flexible hinge, where the platform is a cube-shaped platform; the moving pair includes a first rigid beam, a second flexible hinge, a second rigid beam, a third flexible hinge, and an L-shaped rigid beam; the first rigid beam is connected to the second rigid beam through the second flexible hinge, the second rigid beam is connected to the L-shaped rigid beam through the third flexible hinge, and the L-shaped rigid beam is connected to the platform through the first flexible hinge; the first rigid beam is fastened on a rack through a fastening member; there are four moving pairs in total; each moving pair and one first flexible hinge constitute one branch hinge, and there are four branch hinges in total; the four branch hinges are respectively located on upper, lower, left, and right surfaces of the platform, and the four branch hinges drive, through the first flexible hinge, the platform to generate displacement in an x-direction and a y-direction.

Further, the four moving pairs are respectively distributed on upper, lower, left, and right directions of the platform, forces F1 and F3 are respectively applied to left and right moving pairs, to drive the platform to generate the displacement in the x-direction, F1 drives to generate displacement in a positive x-direction, and F3 drives to generate displacement in a negative x-direction; and forces F4 and F2 are respectively applied to upper and lower moving pairs, to generate the displacement in the y-direction, F2 drives to generate displacement in a positive y-direction, and F4 drives to generate displacement in a negative y-direction.

Further, two branch hinges opposite to the platform are in central symmetry and constitute one group, two branch hinges acted by F1 and F3 constitute one group, and generate angular displacement rotating around a z-axis along an anticlockwise direction, and two branch hinges acted by F2 and F4 constitute the other group, and generate angular displacement rotating around the z-axis along a clockwise direction.

Further, the forces F1, F2, F3, and F4 are generated by driving a piezoelectric driver, act on an end of a lever of the L-shaped rigid beam, and are perpendicular to the L-shaped rigid beam.

Advantageous Effect

The present invention has the following advantageous effects:

The present invention consists of four branches hinges, and has four piezoelectric drivers, and the absolute displacement of the entire platform can be fine-tuned by using component displacement sent by different piezoelectric drivers, and the adjustability is relatively good, and the x-direction displacement and the y-direction displacement can be uncoupled.

To compensate for the disadvantage of the branch hinge of the series micro displacement platform that the rigidity is relatively poor, a parallel moving pair is used in the present invention, and the overall rigidity thereof is greater than that of a common series branch hinge, so that parasitic elastic deformation can be effectively resisted, and load-displacement linearity is relatively good.

To reduce the effect of resistance of rigidity against the driving force, direct force is not input into an input end; instead, a leverage equivalent torque is input, to amplify input displacement, thereby making a branch hinge moving range larger, and the present invention is applicable to optical precise positioning and mechanical part precise measurement.

BRIEF DESCRIPTION OF THE DRAWINGS

The sole FIGURE is a two-dimensional schematic planar diagram of a two-dimensional three-degree-of-freedom micro-motion platform structure for high-precision positioning and measurement of the present invention.

DETAILED DESCRIPTION OF THE INVENTION

The present invention is further described below with reference to the accompanying drawings.

A two-dimensional three-degree-of-freedom micro-motion platform structure for high-precision positioning and measurement of the present invention includes a platform 7, a first flexible hinge 6, and a moving pair that is fastened on the platform 7 through the first flexible hinge 6. The platform 7 is a cube-shaped platform. The moving pair includes a first rigid beam 1, a second flexible hinge 2, a second rigid beam 3, a third flexible hinge 4, and an L-shaped rigid beam 5. The specific composition mode of the micro-motion platform structure is as follows: the first rigid beam 1 is connected to the second rigid beam 3 through the second flexible hinge 2, the second rigid beam 3 is connected to the L-shaped rigid beam 5 through the third flexible hinge 4, and the L-shaped rigid beam 5 is connected to the platform 7 through the first flexible hinge 6; and the first rigid beam 1 is completely fastened on a rack through a fastening member (not shown). In the present invention, there are four moving pairs in total. Each moving pair and one first flexible hinge 6 constitute one branch hinge. The four branch hinges are respectively located on upper, lower, left, and right surfaces of the platform, and the four branch hinges drive, through the first flexible hinge 6, the platform 7 to generate displacement in an x-direction and a y-direction. After the moving pair is fastened on the platform 7 through the first flexible hinge 6, the first rigid beam 1 is fastened on the rack. In practice, a fastening member may be used for fastening, to facilitate detachment. In this case, the micro-motion platform structure is mounted, and is ready for use.

The first rigid beam 1 is completely fastened, and has a 0-degree-of-freedom. In practice, a fastening member may be used for fastening, to facilitate detachment. The second rigid beam 3 functions for connection, has large rigidity, has no self-deformation, or a slight and negligible self-deformation. The first flexible hinge 6, the second flexible hinge 2, and the third flexible hinge 4 are "revolute pairs" of a compliant mechanism, and provide rotating angular displacement. The L-shaped rigid beam 5 is an end to which driving force is applied, and functions to amplify the driving force by using a lever, so that the "moving pair" of the micro-motion platform structure generates relatively large micro displacement, thereby obtaining platform moving displacement in a relatively large range. It should be noted that an acting point of the driving force, as shown in the sole FIGURE, should be at the end of the lever of the L-shaped rigid beam 5, and perpendicular to the L-shaped rigid beam 5. The platform 7 is configured to place a mechanism to be positioned or a part to be measured. The driving force is driven by a piezoelectric driver.

The four moving pairs are respectively distributed on upper, lower, left, and right directions of the platform 7. Forces F1 and F3 are respectively applied to left and right moving pairs, to drive the platform 7 to generate the displacement in the x-direction. F1 drives to generate displacement in a positive x-direction, and F3 drives to generate displacement in a negative x-direction. Forces F4 and F2 are respectively applied to upper and lower moving pairs, to generate the displacement in the y-direction. F2 drives to generate displacement in a positive y-direction, and F4 drives to generate displacement in a negative y-direction. If single displacement in the x-direction or single displacement in the y-direction is required, only one piezoelectric driver can perform action. If only a piezoelectric driver that generates the driving force F1 is driven, the driving force F1 acts on the L-shaped rigid beam 5 to generate the displacement along the positive x-direction; and if only a piezoelectric driver that generates the driving force F3 is driven, the driving force F3 acts on the L-shaped rigid beam 5 to generate the displacement along the negative x-direction. Similarly, if only a piezoelectric driver that generates the driving force F2 is driven, the driving force F2 acts on the L-shaped rigid beam 5 to generate the displacement along the positive y-direction; and if only a piezoelectric driver that generates the driving force F4 is driven, the driving force F4 acts on the L-shaped rigid beam 5 to generate the displacement along the negative y-direction. As shown in the sole FIGURE, if to obtain composite displacement in an xoy plane, two adjacent piezoelectric drivers in corresponding displacement directions need to be enabled to work simultaneously, and the composite displacement can be obtained according to a superposition principle.

In the two-dimensional three-degree-of-freedom micro-motion platform structure for high-precision positioning and measurement of the present invention, two branch hinges opposite to the cube-shaped platform are in central symmetry and constitute one group, and the four branch hinges are divided into two groups in total. Two branch hinges acted by F1 and F3 constitute one group, and generate angular displacement rotating around a z-axis along an anticlockwise direction, and two branch hinges acted by F2 and F4 constitute the other group, and generate angular displacement rotating around the z-axis along a clockwise direction. If to obtain the angular displacement rotating around the z-axis, the two branch hinges in central symmetry need to be driven by corresponding piezoelectric drivers. For example, if to obtain the angular displacement rotating around the z-axis along the anticlockwise direction, the piezoelectric driver that generates the driving force F1 and the piezoelectric driver that generates the driving force F3 need to be driven simultaneously, and similarly, if to obtain the angular displacement rotating around the z-axis along the clockwise direction, the piezoelectric driver that generates the driving force F2 and the piezoelectric driver that generates the driving force F4 need to be driven simultaneously, as shown in the sole FIGURE.

In the two-dimensional three-degree-of-freedom micro-motion platform structure for high-precision positioning and measurement of the present invention, the L-shaped rigid beam 5 is a beam to which the driving force is applied, and functions to enable, by using a lever principle, the moving pair of the micro-motion platform structure to generate relatively large micro displacement, thereby obtaining platform moving displacement in a large range. When the angular displacement rotating along the z-axis is generated, the principle is to generate a pair of torques of a same direction (both are of a clockwise direction or both are of an anticlockwise direction), thereby generating a rotating effect. Therefore, for two branch hinges in central symmetry, to generate torques of a same direction, the acting point of the driving force of the piezoelectric driver (as shown in the sole FIGURE) needs to be on the end of the lever of the L-shaped rigid beam 5, and the driving forces F1, F2, F3, and F4 that are perpendicular to the L-shaped rigid beam 5 are generated. In the present invention, the driving forces F1, F2, F3, and F4 that are perpendicular to the L-shaped rigid beam 5 may be generated by using the piezoelectric driver, or the driving forces F1, F2, F3, and F4 may be generated by using another micro displacement driver.

The foregoing descriptions are merely preferred implementations of the present invention, and it should be noted that a person of ordinary skill in the art can further make several improvements without departing from the principles of the present invention. These improvements should also be considered as falling within the protection scope of the present invention.

What is claimed is:

1. A two-dimensional three-degree-of-freedom micro-motion platform structure for high-precision positioning and measurement, comprising: a platform, a first flexible hinge, and a moving pair that is fastened on the platform through the first flexible hinge, wherein the platform is a cube-shaped platform; the moving pair comprises a first rigid beam, a second flexible hinge, a second rigid beam, a third flexible hinge, and an L-shaped rigid beam; the first rigid beam is connected to the second rigid beam through the second flexible hinge, the second rigid beam is connected to the L-shaped rigid beam through the third flexible hinge, and the L-shaped rigid beam is connected to the platform through the first flexible hinge; the first rigid beam is fastened on a rack through a fastening member; there are four moving pairs in total; each moving pair and one first flexible hinge constitute one branch hinge, and there are four branch hinges in total; the four branch hinges are respectively located on upper, lower, left, and right surfaces of the platform, and the four branch hinges drive, through the first flexible hinge, the platform to generate displacement in an x-direction and a y-direction.

2. The two-dimensional three-degree-of-freedom micro-motion platform structure for high-precision positioning and measurement according to claim 1, wherein the four moving pairs are respectively distributed on upper, lower, left, and right directions of the platform, forces F1 and F3 are respectively applied to left and right moving pairs, to drive the platform to generate the displacement in the x-direction, F1 drives to generate displacement in a positive x-direction, and F3 drives to generate displacement in a negative x-direction; and forces F4 and F2 are respectively applied to upper and lower moving pairs, to generate the displacement in the y-direction, F2 drives to generate displacement in a positive y-direction, and F4 drives to generate displacement in a negative y-direction.

3. The two-dimensional three-degree-of-freedom micro-motion platform structure for high-precision positioning and measurement according to claim 2, wherein the forces F1, F2, F3, and F4 are generated by driving a piezoelectric driver, act on the lever end of the L-shaped rigid beam, and are perpendicular to the L-shaped rigid beam.

4. The two-dimensional three-degree-of-freedom micro-motion platform structure for high-precision positioning and measurement according to claim 1, wherein two branch hinges opposite to the platform are in central symmetry and constitute one group, two branch hinges acted by F1 and F3 constitute one group, and generate angular displacement rotating around a z-axis along an anticlockwise direction, and two branch hinges acted by F2 and F4 constitute the other group, and generate angular displacement rotating around the z-axis along a clockwise direction.

5. The two-dimensional three-degree-of-freedom micro-motion platform structure for high-precision positioning and measurement according to claim 4, wherein the forces F1, F2, F3, and F4 are generated by driving a piezoelectric driver, act on the lever end of the L-shaped rigid beam, and are perpendicular to the L-shaped rigid beam.

* * * * *